US011084579B2

(12) United States Patent
Ivans et al.

(10) Patent No.: US 11,084,579 B2
(45) Date of Patent: Aug. 10, 2021

(54) CONVERTIBLE BIPLANE AIRCRAFT FOR CAPTURING DRONES

(71) Applicant: Textron Innovations Inc., Providence, RI (US)

(72) Inventors: Steven Ray Ivans, Ponder, TX (US); Jason Paul Hurst, Fort Worth, TX (US); Brent Chadwick Ross, Flower Mound, TX (US); John Richard McCullough, Weatherford, TX (US); Paul K. Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 105 days.

(21) Appl. No.: 16/743,203

(22) Filed: Jan. 15, 2020

(65) Prior Publication Data

US 2020/0290737 A1   Sep. 17, 2020

Related U.S. Application Data

(63) Continuation-in-part of application No. 16/427,311, filed on May 30, 2019, now Pat. No. 10,870,487,
(Continued)

(51) Int. Cl.
*B64C 29/02* (2006.01)
*B64D 3/00* (2006.01)
(Continued)

(52) U.S. Cl.
CPC ............ *B64C 29/02* (2013.01); *B64C 39/024* (2013.01); *B64C 39/06* (2013.01); *B64D 1/08* (2013.01);
(Continued)

(58) Field of Classification Search
CPC ............ B64C 2201/12; B64C 2201/18; B64C 2201/182; B64D 5/00; B64D 3/00
See application file for complete search history.

(56) References Cited

U.S. PATENT DOCUMENTS

| 1,655,113 A | 1/1928 | Nikola |
| 3,002,712 A | 10/1961 | Sterling |
(Continued)

FOREIGN PATENT DOCUMENTS

| CN | 105539833 A | 5/2016 | |
| DE | 102007054126 A1 * | 5/2009 | ............... B64D 3/00 |
(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Brian M O'Hara
(74) *Attorney, Agent, or Firm* — Lawrence Youst PLLC

(57) ABSTRACT

An aircraft for capturing drones includes an airframe having a drone channel with first and second wings extending outboard thereof. A two-dimensional distributed thrust array includes a plurality of propulsion assemblies coupled to each of the first and second wings such that the rotor disc of each propulsion assembly is outboard of the drone channel. A flight control system is coupled to the airframe and is operable to independently control each of the propulsion assemblies. A mesh bag is coupled to the drone channel forming a drone capture net. The aircraft is configured to convert between thrust-borne lift in a VTOL orientation and wing-borne lift in a biplane orientation. The aircraft is also configured to overtake a drone during flight in the biplane orientation such that the drone passes through the drone
(Continued)

channel into the mesh bag, thereby capturing the drone in the drone capture net.

20 Claims, 13 Drawing Sheets

Related U.S. Application Data which is a continuation-in-part of application No. 16/246,474, filed on Jan. 12, 2019, now Pat. No. 10,343,773, which is a continuation of application No. 15/200,197, filed on Jul. 1, 2016, now Pat. No. 10,220,944.

(51) Int. Cl.
  *G05D 1/00* (2006.01)
  *B64C 39/02* (2006.01)
  *B64D 1/08* (2006.01)
  *B64C 39/06* (2006.01)
  *B64D 25/12* (2006.01)

(52) U.S. Cl.
  CPC .............. *B64D 3/00* (2013.01); *B64D 25/12* (2013.01); *G05D 1/0011* (2013.01); *B64C 2201/028* (2013.01); *B64C 2201/042* (2013.01); *B64C 2201/044* (2013.01); *B64C 2201/104* (2013.01); *B64C 2201/108* (2013.01); *B64C 2201/14* (2013.01); *B64C 2201/146* (2013.01)

(56) References Cited

U.S. PATENT DOCUMENTS

| | | | |
|---|---|---|---|
| 3,081,964 A | 3/1963 | Quenzler | |
| 3,181,810 A | 5/1965 | Olson | |
| 3,259,343 A | 7/1966 | Roppel | |
| 3,289,980 A | 12/1966 | Gardner | |
| 3,350,035 A | 10/1967 | Schlieben | |
| 3,592,412 A | 7/1971 | Glatfelter | |
| 3,618,875 A | 11/1971 | Kappus | |
| 3,783,618 A | 1/1974 | Kawamura | |
| 3,916,588 A | 11/1975 | Magill | |
| 4,248,394 A * | 2/1981 | Klumpp | B64D 3/00 244/3 |
| 4,458,864 A | 7/1984 | Colombo et al. | |
| 4,571,157 A | 2/1986 | Eickmann | |
| 4,596,368 A | 6/1986 | Schmittle | |
| 4,613,098 A | 9/1986 | Eickmann | |
| 4,771,967 A | 9/1988 | Geldbaugh | |
| 4,913,377 A | 4/1990 | Eickmann | |
| 5,131,605 A | 7/1992 | Kress | |
| 5,592,894 A | 1/1997 | Johnson | |
| 5,842,667 A | 12/1998 | Jones | |
| 6,086,015 A | 7/2000 | MacCready | |
| 6,170,778 B1 | 1/2001 | Cycon et al. | |
| 6,260,793 B1 | 7/2001 | Balayn et al. | |
| 6,270,038 B1 | 8/2001 | Cycon et al. | |
| 6,402,088 B1 | 6/2002 | Syrovy et al. | |
| 6,655,631 B2 | 12/2003 | Austen-Brown | |
| 6,845,939 B1 | 1/2005 | Baldwin | |
| 6,886,776 B2 | 5/2005 | Wagner et al. | |
| 6,892,980 B2 | 5/2005 | Kawai | |
| 7,059,562 B2 | 6/2006 | Baldwin | |
| 7,150,429 B2 | 12/2006 | Kusic | |
| 7,210,654 B1 | 5/2007 | Cox et al. | |
| 7,465,236 B2 | 12/2008 | Wagels | |
| 7,472,863 B2 | 1/2009 | Pak | |
| 7,555,893 B2 | 7/2009 | Okai et al. | |
| 7,984,684 B2 | 7/2011 | Hinderks | |
| 8,152,096 B2 | 4/2012 | Smith | |
| 8,505,846 B1 | 8/2013 | Sanders | |
| 8,602,348 B2 | 12/2013 | Bryant | |
| 8,733,690 B2 | 5/2014 | Bevirt et al. | |
| 8,800,912 B2 | 8/2014 | Oliver | |
| 8,820,672 B2 | 9/2014 | Erben et al. | |
| 8,833,692 B2 | 9/2014 | Yoeli | |
| 8,909,391 B1 | 12/2014 | Peeters et al. | |
| 8,948,935 B1 | 2/2015 | Peeters et al. | |
| 8,963,362 B2 * | 2/2015 | Sia | H02K 7/1853 290/55 |
| 9,022,312 B2 | 5/2015 | Kosheleff | |
| 9,045,226 B2 | 6/2015 | Piasecki et al. | |
| 9,085,362 B1 * | 7/2015 | Kilian | B64C 25/68 |
| 9,087,451 B1 | 7/2015 | Jarrell | |
| 9,108,744 B2 | 8/2015 | Takeuchi | |
| 9,109,575 B2 | 8/2015 | Weddendorf et al. | |
| 9,120,560 B1 | 9/2015 | Armer et al. | |
| 9,127,908 B2 | 9/2015 | Miralles | |
| 9,162,753 B1 | 10/2015 | Panto et al. | |
| 9,187,174 B2 | 11/2015 | Shaw | |
| 9,193,460 B2 | 11/2015 | Laudrain | |
| 9,221,538 B2 | 12/2015 | Takahashi et al. | |
| 9,242,714 B2 | 1/2016 | Wang et al. | |
| 9,254,916 B2 | 2/2016 | Yang | |
| 9,284,049 B1 | 3/2016 | Wang et al. | |
| 9,321,530 B2 | 4/2016 | Wang et al. | |
| 9,376,208 B1 | 6/2016 | Gentry | |
| 9,388,794 B2 | 7/2016 | Weddendorf et al. | |
| 9,403,593 B2 | 8/2016 | Downey et al. | |
| 9,440,736 B2 | 9/2016 | Bitar | |
| 9,463,875 B2 | 10/2016 | Abuelsaad et al. | |
| 9,493,225 B2 | 11/2016 | Wang et al. | |
| 9,610,817 B1 | 4/2017 | Piasecki et al. | |
| 9,643,720 B2 | 5/2017 | Hesselbarth | |
| 9,694,908 B2 | 7/2017 | Razroev | |
| 9,694,911 B2 | 7/2017 | Bevirt et al. | |
| 9,714,087 B2 | 7/2017 | Matsuda | |
| 9,821,909 B2 | 11/2017 | Moshe | |
| 9,963,228 B2 | 5/2018 | McCullough et al. | |
| 9,994,313 B2 | 6/2018 | Claridge et al. | |
| 10,011,351 B2 | 7/2018 | McCullough et al. | |
| 10,124,890 B2 | 11/2018 | Sada-Salinas et al. | |
| 10,183,746 B2 | 1/2019 | McCullough et al. | |
| 10,214,285 B2 | 2/2019 | McCullough et al. | |
| 10,220,944 B2 | 3/2019 | McCullough et al. | |
| 10,227,133 B2 | 3/2019 | McCullough et al. | |
| 10,232,950 B2 | 3/2019 | McCullough et al. | |
| 10,926,875 B2 * | 2/2021 | Klein | B64C 39/024 |
| 11,027,845 B2 * | 6/2021 | Theiss | B64D 17/78 |
| 2002/0100834 A1 | 8/2002 | Baldwin | |
| 2002/0100835 A1 | 8/2002 | Kusic | |
| 2003/0062443 A1 | 4/2003 | Wagner et al. | |
| 2004/0245374 A1 | 12/2004 | Morgan | |
| 2006/0091258 A1 | 5/2006 | Chiu et al. | |
| 2006/0266881 A1 | 11/2006 | Hughey | |
| 2007/0221780 A1 | 9/2007 | Builta | |
| 2009/0008499 A1 | 1/2009 | Shaw | |
| 2010/0147993 A1 | 6/2010 | Annati et al. | |
| 2010/0295321 A1 | 11/2010 | Bevirt | |
| 2011/0042508 A1 | 2/2011 | Bevirt | |
| 2011/0042509 A1 | 2/2011 | Bevirt et al. | |
| 2011/0057453 A1 | 3/2011 | Roberts | |
| 2011/0121570 A1 * | 5/2011 | Bevirt | F03D 5/06 290/44 |
| 2011/0315806 A1 | 12/2011 | Piasecki et al. | |
| 2012/0209456 A1 | 8/2012 | Harmon et al. | |
| 2012/0234968 A1 | 9/2012 | Smith | |
| 2013/0020429 A1 | 1/2013 | Kroo | |
| 2013/0175404 A1 | 7/2013 | Shefer | |
| 2014/0018979 A1 | 1/2014 | Goossen et al. | |
| 2015/0012154 A1 | 1/2015 | Senkel et al. | |
| 2015/0014475 A1 | 1/2015 | Taylor et al. | |
| 2015/0136897 A1 | 5/2015 | Seibel et al. | |
| 2015/0284079 A1 | 10/2015 | Matsuda | |
| 2015/0285165 A1 | 10/2015 | Steinwandel et al. | |
| 2016/0068265 A1 | 3/2016 | Hoareau et al. | |
| 2016/0180717 A1 | 6/2016 | Ubhi et al. | |
| 2016/0214712 A1 | 7/2016 | Fisher et al. | |
| 2016/0376029 A1 * | 12/2016 | Sekiya | B64D 17/80 244/11 OF |
| 2017/0021924 A1 | 1/2017 | Kubik et al. | |

(56) References Cited

U.S. PATENT DOCUMENTS

| | | |
|---|---|---|
| 2017/0066531 A1 | 3/2017 | McAdoo |
| 2017/0097644 A1 | 4/2017 | Fegely et al. |
| 2017/0158312 A1 | 6/2017 | Alber et al. |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002013 A1 | 1/2018 | McCullough et al. |
| 2018/0002026 A1 | 1/2018 | Oldroyd et al. |
| 2018/0105271 A1* | 4/2018 | Wypyszynski ....... B64C 39/024 |
| 2018/0244383 A1 | 8/2018 | Valente et al. |
| 2018/0265193 A1 | 9/2018 | Gibboney et al. |
| 2020/0324896 A1* | 10/2020 | Noura .................... B64C 27/08 |

FOREIGN PATENT DOCUMENTS

| | | |
|---|---|---|
| FR | 2977865 A3 | 1/2013 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.

* cited by examiner

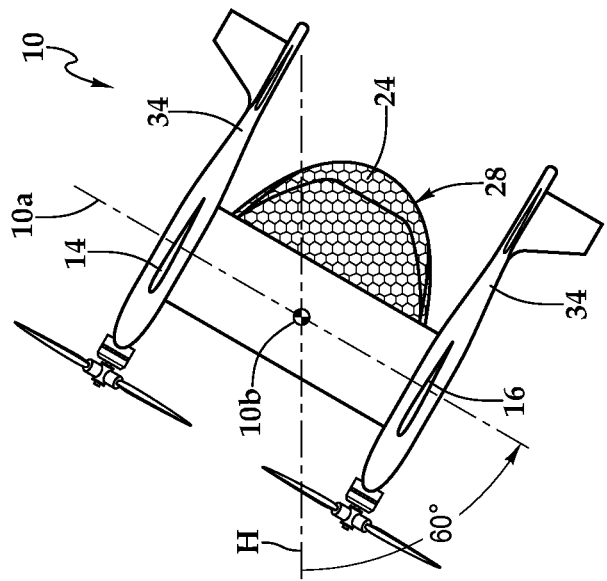
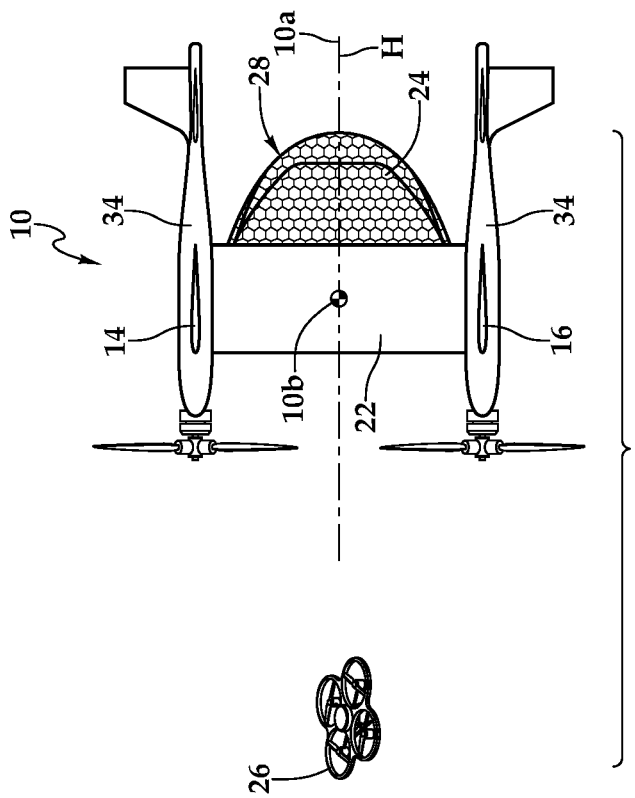
Fig.2D
Fig.2E

CONVERTIBLE BIPLANE AIRCRAFT FOR CAPTURING DRONES

CROSS-REFERENCE TO RELATED APPLICATIONS

The present application is a continuation-in-part of co-pending application Ser. No. 16/427,311 filed May 30, 2019, which is a continuation-in-part of application Ser. No. 16/246,474 filed Jan. 12, 2019, now U.S. Pat. No. 10,343,773, which is a continuation of application Ser. No. 15/200,197 filed Jul. 1, 2016, now U.S. Pat. No. 10,220,944, the entire contents of each is hereby incorporated by reference.

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft operable to overtake and capture drone aircraft during flight in a drone capture net configured to disable the drone and/or remove the drone from a threat theater.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. Drones are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few. Certain drones have the capability of being networked together enabling cooperation with one another including, for example, exhibiting swarm behavior such as the ability to dynamically adapt to changing conditions or parameters, group coordination, distributed control, distributed tactical group planning, distributed tactical group goals, distributed strategic group goals and/or fully autonomous swarming.

With these advancing capabilities, in the wrong hands, drones can pose an array of security risks or threats. For example, drones can create airspace threats when flown near airports, can be used to smuggle contraband, conduct espionage activities, carry light to medium weight weapons, deploy dangerous chemical weapons or even carry out a nuclear attack. Accordingly, a need has arisen for law enforcement and other authorities to have the ability to capture, disable and/or remove unauthorized or malicious drones from a threat theater.

SUMMARY

In a first aspect, the present disclosure is directed to an aircraft for capturing a drone. The aircraft includes an airframe having a drone channel with first and second wings extending outboard thereof. A two-dimensional distributed thrust array is attached to the airframe. The thrust array includes a plurality of propulsion assemblies coupled to the first wing and a plurality of propulsion assemblies coupled to the second wing such that a rotor disc of each propulsion assembly is outboard of the drone channel. A flight control system is coupled to the airframe and is operable to independently control each of the propulsion assemblies. A mesh bag is coupled to the drone channel forming a drone capture net. The aircraft is configured to convert between thrust-borne lift in a VTOL orientation and wing-borne lift in a biplane orientation. In addition, the aircraft is configured to overtake the drone during flight in the biplane orientation such that the drone passes through the drone channel into the mesh bag, thereby capturing the drone in the drone capture net.

In some embodiments, the drone channel may have a regular convex polygon shaped perimeter. In certain embodiments, the drone channel may have a rectangular shaped perimeter such as a square shaped perimeter. In other embodiments, the drone channel may have a circular shaped perimeter. In some embodiments, the first and second wings may be parallel to each other. In certain embodiments, the first wing may have a starboard wing section extending from a starboard side of the drone channel and a port wing section extending from a port side of the drone channel. Likewise, the second wing may have a starboard wing section extending from the starboard side of the drone channel and a port wing section extending from the port side of the drone channel. In some embodiments, at least a portion of the first wing may form a portion of the drone channel and at least a portion of the second wing may form a portion of the drone channel. In certain embodiments, each of the wings may include a polygon section or an arcuate section. In some embodiments, the mesh bag may be formed from a filament matrix with open spaces configured to allow air to pass therethrough during flight. In certain embodiments, the mesh bag may be configured to disable rotary operations of the drone after capturing the drone. In some embodiments, the mesh bag may be a releasable mesh bag that is configured to be jettisoned from the drone channel after capturing the drone.

In a second aspect, the present disclosure is directed to an aircraft for capturing a drone. The aircraft includes an airframe having first and second wings with first and second pylons extending therebetween forming a drone channel. A two-dimensional distributed thrust array is attached to the airframe. The thrust array includes a plurality of propulsion assemblies coupled to the first wing and a plurality of propulsion assemblies coupled to the second wing such that a rotor disc of each propulsion assembly is outboard of the drone channel. A flight control system is coupled to the airframe and is operable to independently control each of the propulsion assemblies. A mesh bag is coupled to the drone channel forming a drone capture net. The aircraft is configured to convert between thrust-borne lift in a VTOL orientation and wing-borne lift in a biplane orientation. In addition, the aircraft is configured to overtake the drone during flight in the biplane orientation such that the drone passes through the drone channel into the mesh bag, thereby capturing the drone in the drone capture net.

In some embodiments, the drone channel may have a perimeter shape formed as a regular convex polygon, a rectangle, a square or a circle. In certain embodiments, the first and second wings may be parallel to each other and the first and second pylons may be parallel to each other such that the drone channel has a rectangular shaped perimeter. In some embodiments, each of the wings may include a polygon section and each of the pylons may have a polygon section profile such that the drone channel has a regular convex polygon shaped perimeter. In certain embodiments, each of the wings may include an arcuate section and each of the pylons may have an arcuate profile such that the drone channel has a circular shaped perimeter. In some embodiments, the mesh bag may be formed from a filament matrix with open spaces configured to allow air to pass therethrough during flight and configured to disable rotary operations of the drone after capturing the drone. In certain embodiments, the mesh bag may be a releasable mesh bag that is configured to be jettisoned from the drone channel after capturing the drone.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2K are schematic illustrations of the drone capture aircraft of FIG. 1 in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
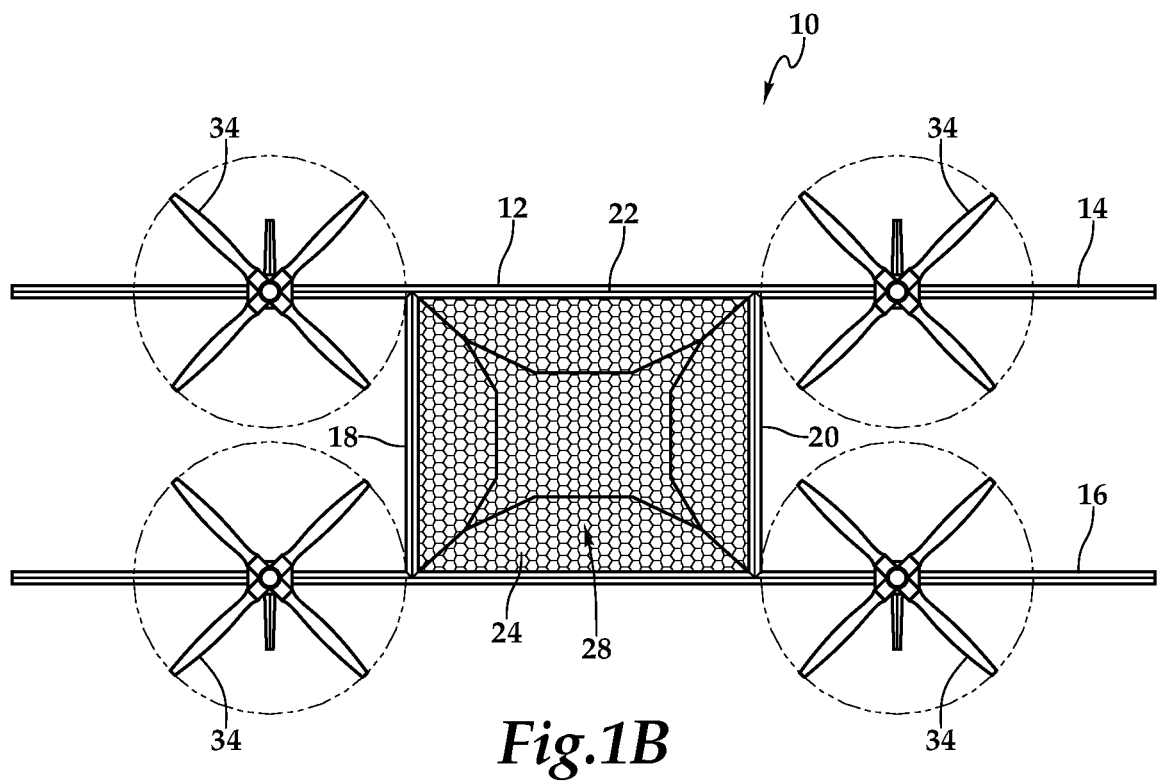
FIGS. 1A-1F are schematic illustrations of a drone capture aircraft operable to convert between thrust-borne lift in a VTOL orientation and wing-borne lift in a biplane orientation in accordance with embodiments of the present disclosure.
Figure 1A:
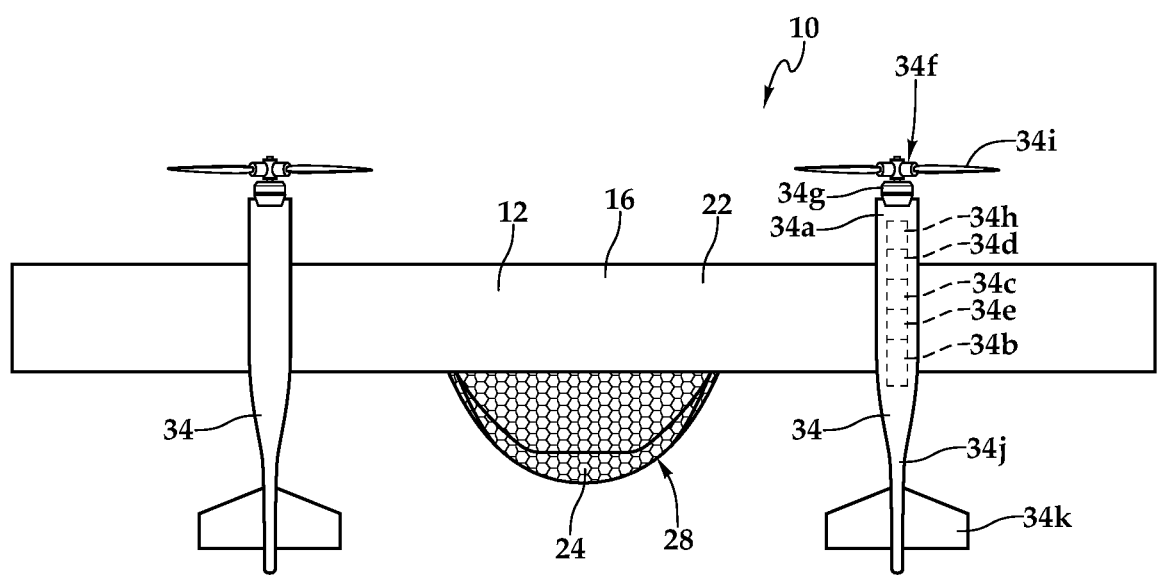
Figure 1D:
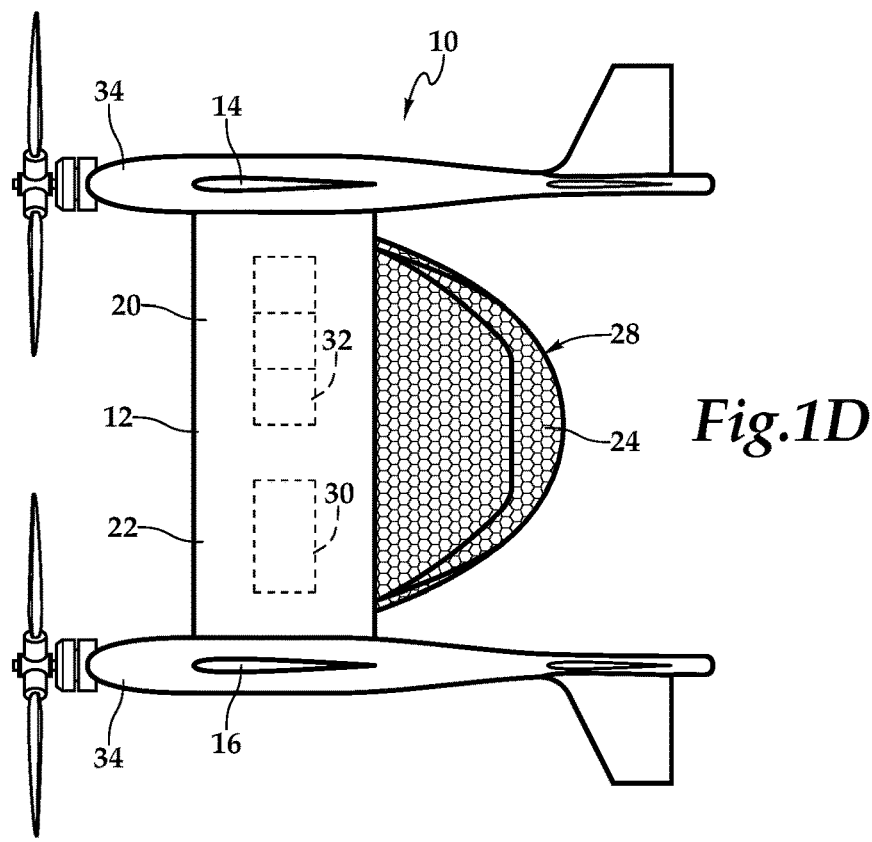
Figure 1C:
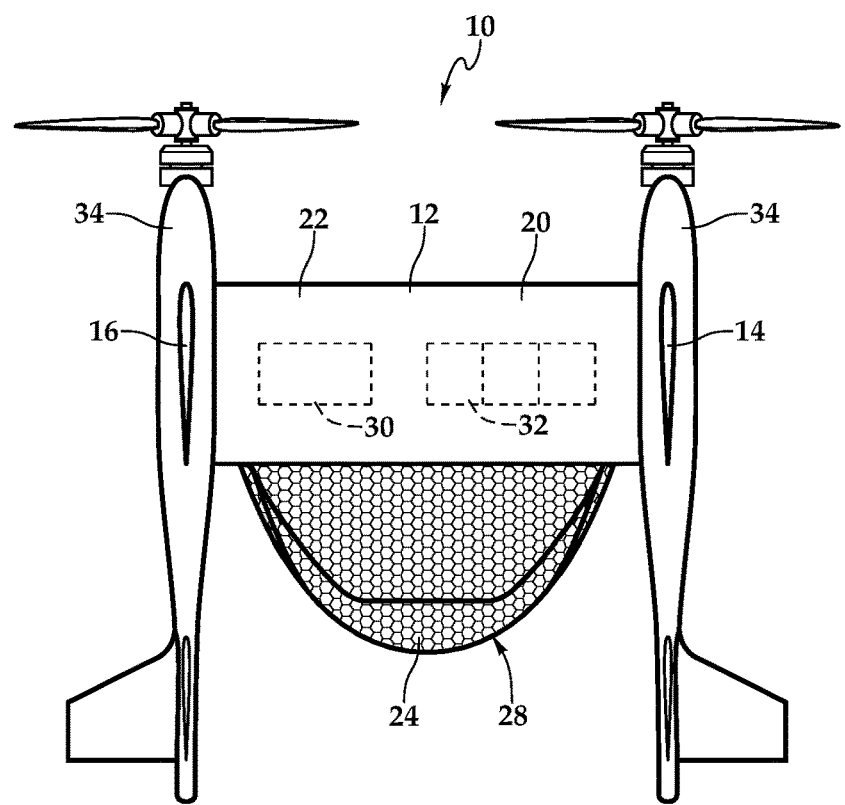
Figure 1F:
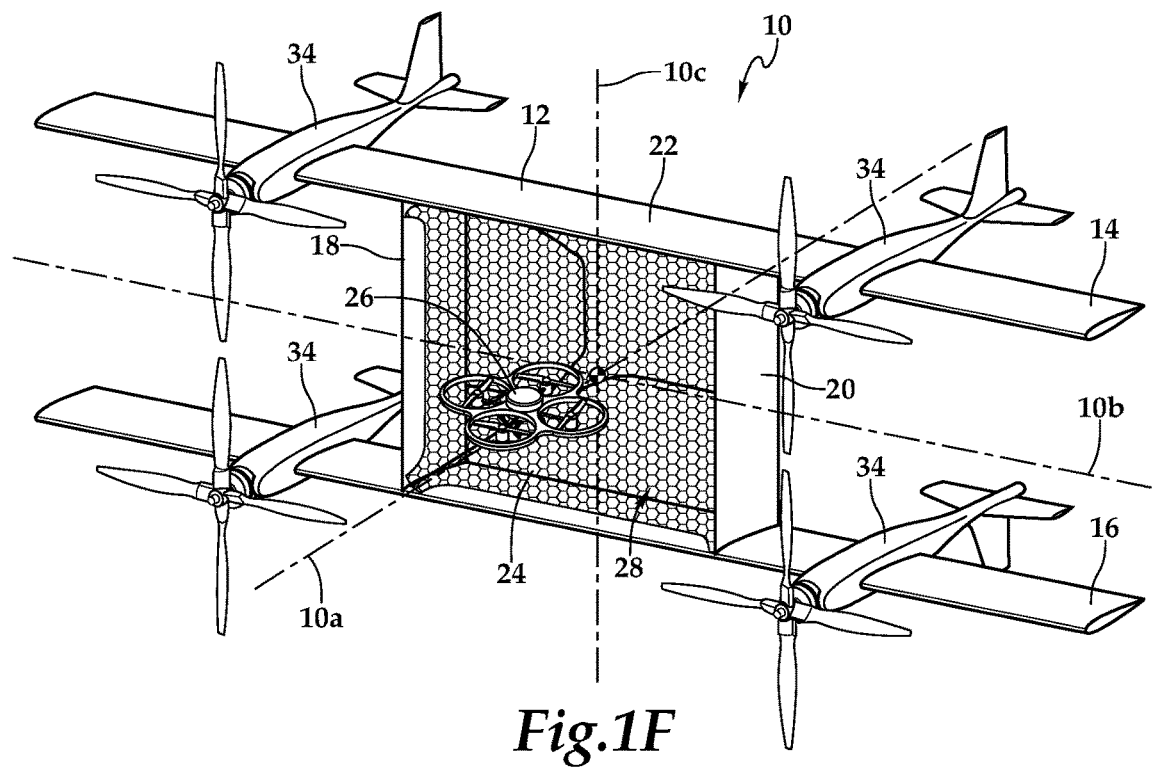
Figure 1E:
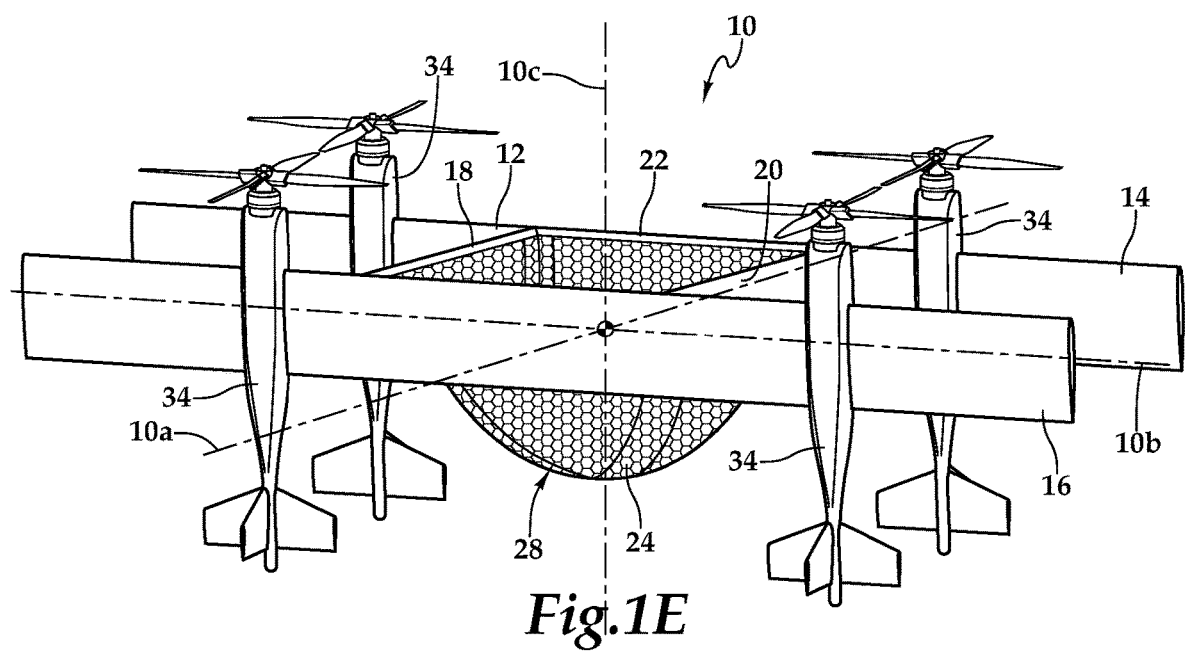

Referring to FIGS. 1A-1E in the drawings, various views of an aircraft 10 operable to transition between thrust-borne lift in a VTOL orientation and wing-borne lift in a biplane orientation are depicted. FIGS. 1A, 1C and 1E depict aircraft 10 in the VTOL orientation wherein the propulsion assemblies provide thrust-borne lift. FIGS. 1B, 1D and 1F depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1E and 1F. When longitudinal axis 10a and lateral axis 10b are both in a horizontal plane and normal to the local vertical in the earth's reference frame, aircraft 10 has a level flight attitude.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As best seen in FIG. 1B, in the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. As best seen in FIGS. 1B and 1F, the central portion of wings 14, 16 and pylons 18, 20 together create a drone channel 22 having a perimeter in the shape of a rectangle or square depending upon the precise inboard/outboard locations of pylons 18, 20 along wings 14, 16. Alternatively, airframe 12 could be described as having a drone channel 22 in the form of rectangle or square that has two wing sections extending, respectively, in the port and starboard directions from drone channel 22 that together form wing 14 and two wing sections extending, respectively, in the port and starboard directions from drone channel 22 that together form wing 16. Coupled to drone channel 22 is a mesh bag 24 depicted as a filament matrix with open spaces therebetween such that air is able to pass through mesh bag 24 during flight and, in particular, to enable high speed forward flight with minimal drag. The filament matrix is preferable formed from a polymer such as polyamides, nylons or other high performance plastics having a suitably high tensile strength to enable the capture of a drone 26 during high speed flight, as best seen in FIG. 1F. Together, drone channel 22 and mesh bag 24 may be referred to as a drone capture net 28. Is some embodiments, mesh bag 24 may be releasable from drone channel 22 such that mesh bag 24 and a captured drone may be jettisoned from aircraft 10 during flight.

Wings 14, 16 and/or pylons 18, 20 may preferably include internal passageways operable to contain flight control systems, energy sources, communication lines and other desired systems. For example, as best seen in FIGS. 1C and 1D, pylon 20 houses the flight control system 30 of aircraft 10. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

Wings 14, 16 and pylons 18, 20 may contain one or more of electrical power sources depicted as one or more batteries 32 in pylon 20, as best seen in FIGS. 1C and 1D. Batteries 32 supply electrical power to flight control system 30. In some embodiments, batteries 32 may be used to supply electrical power for the distributed thrust array of aircraft 10. Wings 14, 16 and pylons 18, 20 also contain a communication network that enables flight control system 30 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually and collectively denoted as 34. In the illustrated embodiment, two propulsion assemblies 34 are coupled to wing 14 and two propulsion assemblies 34 are coupled to wing 16 in such that each propulsion assembly 34 has a rotor disc that is outboard of drone channel 22, thereby preventing interference with drone capture operations, as best seen in FIG. 1B. Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 34 in a mid-wing configuration, the distributed thrust array of aircraft 10 could have propulsion assemblies coupled to the wings in a low wing configuration, a high wing configuration or any combination or permutations thereof. In the illustrated embodiment, propulsion assemblies 34 are variable speed propulsion assemblies having fixed pitch rotor blades and thrust vectoring capability. Depending upon the implementation, propulsion assemblies 34 may have longitudinal thrust vectoring capability, lateral thrust vectoring capability or omnidirectional thrust vectoring capability. In other embodiments, propulsion assemblies 34 may be single speed propulsion assemblies, may have variable pitch rotor blades and/or may be non-thrust vectoring propulsion assemblies.

Propulsion assemblies 34 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to airframe 12. In other embodiments, propulsion assemblies 34 may be permanently coupled to wings 14, 16.

As best seen in FIG. 1A, each propulsion assembly 34 includes a nacelle 34a that houses components including a battery 34b, an electronic speed controller 34c, a gimbal actuator 34d, an electronics node 34e, sensors and other desired electronic equipment. Nacelle 34a also supports a propulsion system 34f including a gimbal 34g, a variable speed electric motor 34h and a rotor assembly 34i. Extending from a lower end of nacelle 34a is a tail assembly 34j that includes aerosurfaces 34k. As the power for each propulsion assembly 34 is provided by batteries 34b housed within the respective nacelle 34a, aircraft 10 has a distributed power system for the distributed thrust array. Alternatively or additionally, electrical power may be supplied to the electric motors 34*h* and/or the batteries 34*b* disposed with the nacelles 34*a* from batteries 32 carried by airframe 12 via the communications network. In other embodiments, power for the propulsion assemblies of aircraft 10 may be provided by one or more internal combustion engines, electric generators and/or hydraulic motors. In the illustrated embodiment, aerosurfaces 34*k* of propulsion assemblies 34 including stationary horizontal and vertical stabilizers. In other embodiments, aerosurfaces 34*k* may be active aerosurfaces that serve as elevators to control the pitch or angle of attack of wings 14, 16 and/or ailerons to control the roll or bank of aircraft 10 in the biplane orientation of aircraft 10. Aerosurfaces 34 also serve to enhance hover stability in the VTOL orientation of aircraft 10.

Flight control system 30 communicates via the wired communications network of airframe 12 with electronics nodes 34*e* of propulsion assemblies 34. Flight control system 30 receives sensor data from and sends flight command information to the electronics nodes 34*e* such that each propulsion assembly 34 may be individually and independently controlled and operated. For example, flight control system 30 is operable to individually and independently control the speed and the thrust vector of each propulsion assembly 34. Flight control system 30 may autonomously control some or all aspects of flight operation for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operation for aircraft 10. The autonomous and/or remote operation of aircraft 10 enables aircraft 10 to perform drone capture operations.

Each propulsion assembly 34 includes a rotor assembly 34*i* that is coupled to an output drive of a respective electrical motor 34*h* that rotates the rotor assembly 34*i* in a rotational plane to generate thrust for aircraft 10. In the illustrated embodiment, rotor assemblies 34*i* each include four rotor blades having a fixed pitch. In other embodiments, the rotor assemblies could have other numbers of rotor blades including rotor assemblies having less than or more than four rotor blades. Alternatively or additionally, the rotor assemblies could have variable pitch rotor blades with collective and/or cyclic pitch control. Each electrical motor 34*h* is paired with a rotor assembly 34*i* to form a propulsion system 34*f*. In the illustrated embodiment, each propulsion system 34*f* has a two-axis tilting degree of freedom relative to nacelle 34*a* provided by gimbal 34*g* such that propulsion assemblies 34 are omnidirectional thrust vectoring propulsion assemblies. In the illustrated embodiment, the maximum angle of the thrust vector may preferably be between about 10 degrees and about 30 degrees, may more preferably be between about 15 degrees and about 25 degrees and may most preferably be about 20 degrees. Notably, using a 20-degree thrust vector yields a lateral component of thrust that is about 34 percent of total thrust. In other embodiments, the propulsion systems may have a single-axis tilting degree of freedom in which case, the propulsion assemblies could act as longitudinal and/or lateral thrust vectoring propulsion assemblies.

In one non-limiting example, aircraft 10 may operate as a drone capture aircraft. As best seen in FIG. 1F, during high speed forward flight, aircraft 10 is operation to overtake drone 26. It is noted that typical drones in the form of multicopters, such as the illustrated quadcopter 26, have a relatively low top speed and a slow dynamic response as speed, direction and elevation changes require motors to speed up and/or slow down the props creating significant delay in dynamic response due to prop inertia. Aircraft 10 during wing-borne lift operations, is capability of significantly higher airspeed and is highly maneuverable thus enabling aircraft 10 to overtake drone 26 during flight such that drone 26 passes through drone channel 22 and into mesh bag 24, thereby capturing drone 26 in drone capture net 28. Preferably, mesh bag 24 is configured to ensnare drone 26 disabling rotary operations of drone 26, depending upon the rotor configuration of drone 26. Alternatively or additionally, once aircraft 10 overtakes and captures drone 26, aircraft 10 is operable to continue high speed flight with drone 26 trapped in drone capture net 28 to remove drone 26 from a threat theater and/or transport drone 26 to a desired location.

Figure 2A:
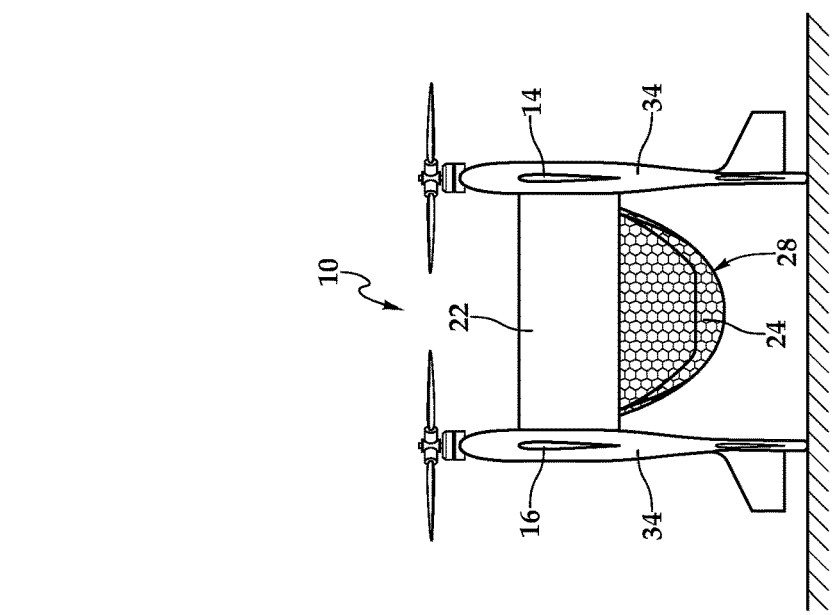

Referring additionally to FIGS. 2A-2K in the drawings, a sequential flight-operating scenario of aircraft 10 is depicted. As best seen in FIG. 2A, aircraft 10 is in a tailsitter position on the ground with mesh bag 24 attached to drone channel 22 forming drone capture net 28. When aircraft 10 is ready for a drone capture mission, flight control system 30 commences operations providing flight commands to the various components of aircraft 10. Flight control system 30 may be operating responsive to autonomous flight control, remote flight control or a combination thereof. For example, it may be desirable to utilize remote flight control during certain maneuvers such as takeoff and landing but rely on autonomous flight control during hover, high speed forward flight, transitions between wing-borne flight and thrust-borne flight, drone targeting and/or drone capture.

Figure 2B:
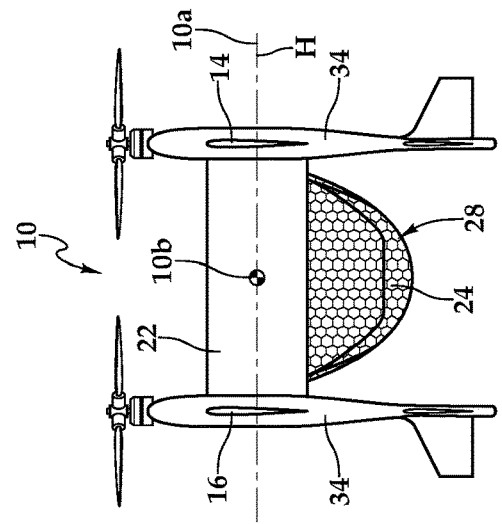

As best seen in FIG. 2B, aircraft 10 has performed a vertical takeoff and is engaged in thrust-borne lift in the VTOL orientation of aircraft 10. As illustrated, the rotor assemblies of propulsion assemblies 34 are each rotating in the same horizontal plane. As longitudinal axis 10*a* and lateral axis 10*b* (denoted as the target) are both in a horizontal plane H that is normal to the local vertical in the earth's reference frame, aircraft 10 has a level flight attitude. In the VTOL orientation, wing 16 is a forward wing and wing 14 is an aft wing. As discussed herein, flight control system 30 independently controls and operates each propulsion assembly 34 including independently controlling speed and thrust vector. During hover, flight control system 30 may utilize differential speed control and/or differential or collective thrust vectoring of propulsion assemblies 34 to provide hover stability for aircraft 10 and to provide pitch, roll, yaw and translation authority for aircraft 10.

Figure 2C:
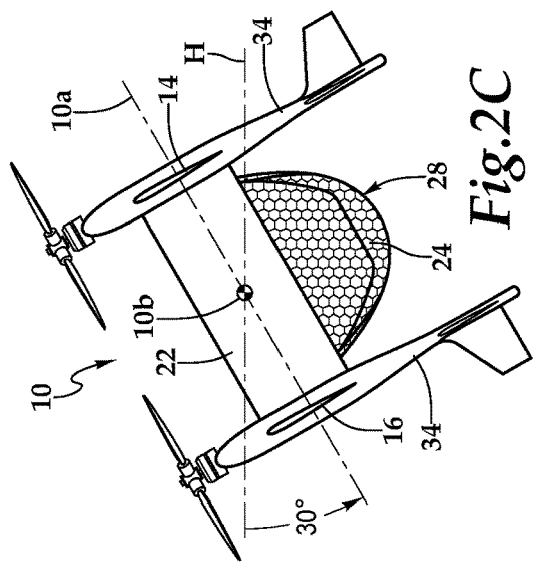

After vertical ascent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10*a* extends out of the horizontal plane H such that aircraft 10 has an inclined flight attitude of about thirty degrees pitch down. As seen in FIG. 2D, longitudinal axis 10*a* extends out of the horizontal plane H such that aircraft 10 has an inclined flight attitude of about sixty degrees pitch down. Flight control system 30 may achieve this operation through speed control of some or all of propulsion assemblies 34, thrust vectoring of some or all of propulsion assemblies 34 or any combination thereof.

As best seen in FIG. 2E, the rotor assemblies of propulsion assemblies 34 are each rotating in the same vertical plane. In the biplane orientation, wing 14 is above wing 16. By convention, longitudinal axis 10*a* has been reset to be in the horizontal plane H, which also includes lateral axis 10b, such that aircraft 10 has a level flight attitude in the biplane orientation. As forward flight with wing-borne lift requires significantly less power than VTOL flight with thrust-borne lift, the operating speed of some or all of the propulsion assemblies 34 may be reduced. In certain embodiments, some of the propulsion assemblies of aircraft 10 could be shut down during forward flight. In the biplane orientation, the independent control provided by flight control system 30 over each propulsion assembly 34 provides pitch, roll and yaw authority using collective or differential thrust vectoring, differential speed control or any combination thereof.

Figure 2F:
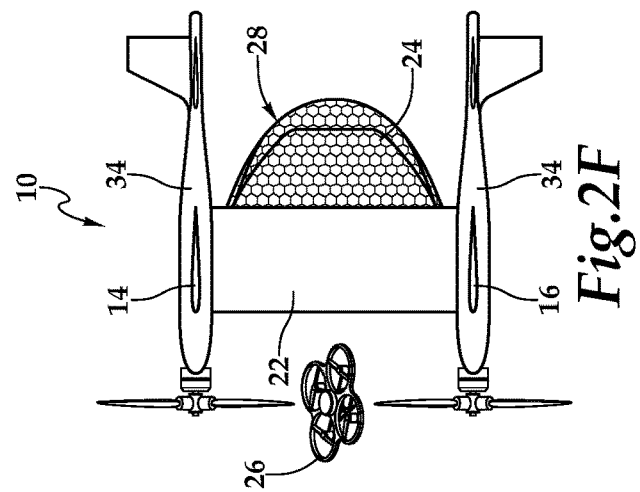
Figure 2G:
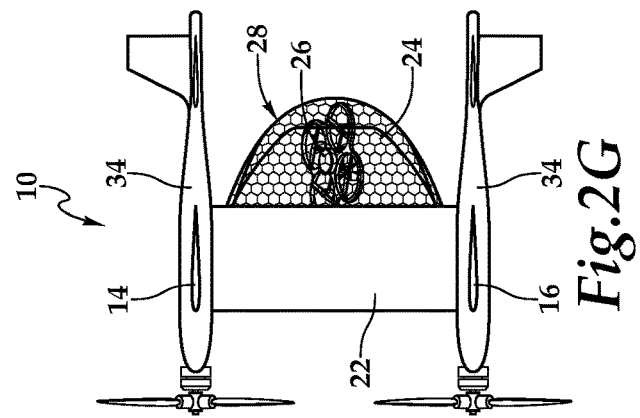

In the illustrated scenario, aircraft 10 has targeted and is approaching drone 26. As discussed herein, aircraft 10 is configured to have significant closing speed relative to drone 26 such that drone 26 is unlikely to be able to evade capture once aircraft 10 has targeted drone 26. As best seen in FIG. 2F, aircraft 10 is overtaking drone 26 such that drone 26 is aligned with drone channel 22 and is sufficiently remote from the rotor discs of propulsion assemblies 34. Preferably, mesh bag 24 is configured to ensnare drone 26 disabling rotary operations of drone 26 once drone 26 is trapped in drone capture net 28, as best seen in FIG. 2G. In the illustrated scenario, after capturing drone 26, aircraft 10 continues to operate in high speed forward flight with drone 26 trapped in drone capture net 28 to remove drone 26 from the threat theater and to transport drone 26 to a desired location.

Figure 2H:
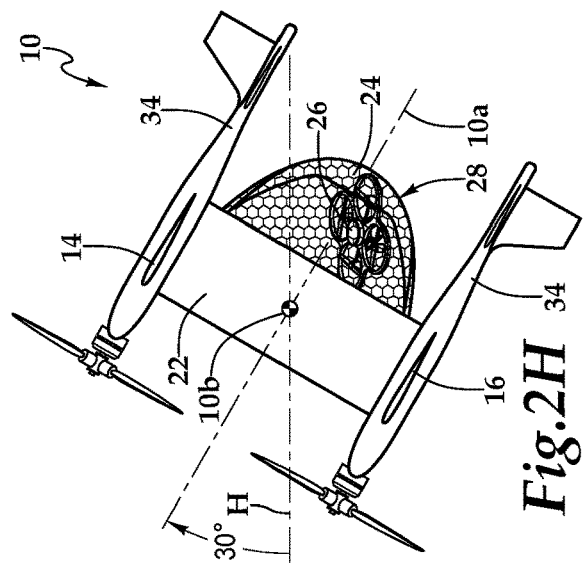
Figure 2I:
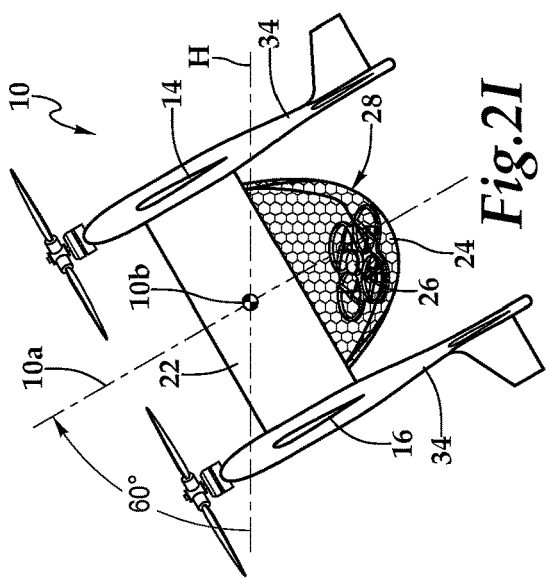
Figure 2J:
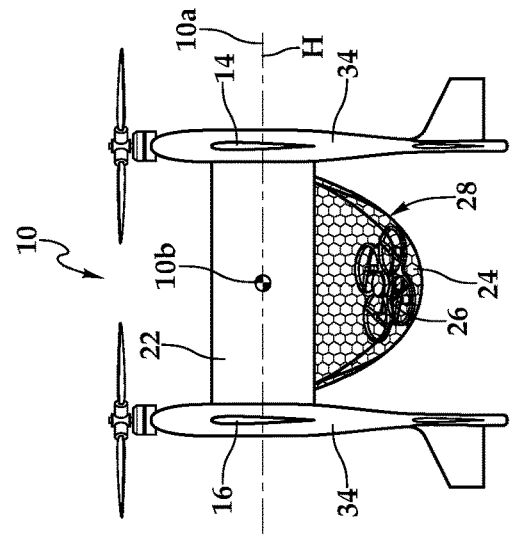
Figure 2K:
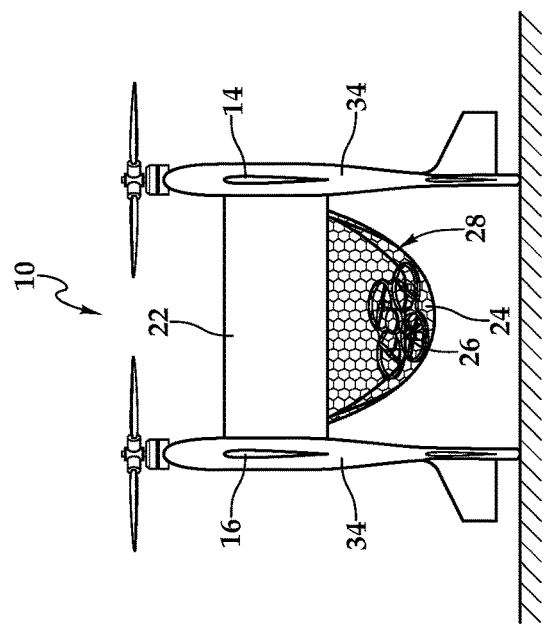

As aircraft 10 approaches the desired location, aircraft 10 may begin its transition from wing-borne lift to thrust-borne lift. As best seen from the progression of FIGS. 2G-2J, aircraft 10 is operable to pitch up from the biplane orientation to the VTOL orientation to enable, for example, a vertical landing operation. As seen in FIG. 2H, longitudinal axis 10a extends out of the horizontal plane H such that aircraft 10 has an inclined flight attitude of about thirty degrees pitch up. As seen in FIG. 2I, longitudinal axis 10a extends out of the horizontal plane H such that aircraft 10 has an inclined flight attitude of about sixty degrees pitch up. Flight control system 30 may achieve this operation through speed control of some or all of propulsion assemblies 34, thrust vectoring of some or all of propulsion assemblies 34 or any combination thereof. In FIG. 2J, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. As best seen in FIG. 2K, aircraft 10 has landing in a tailsitter orientation at the desired location. Drone 26 may now be removed from drone capture net 28.

Figure 3A:
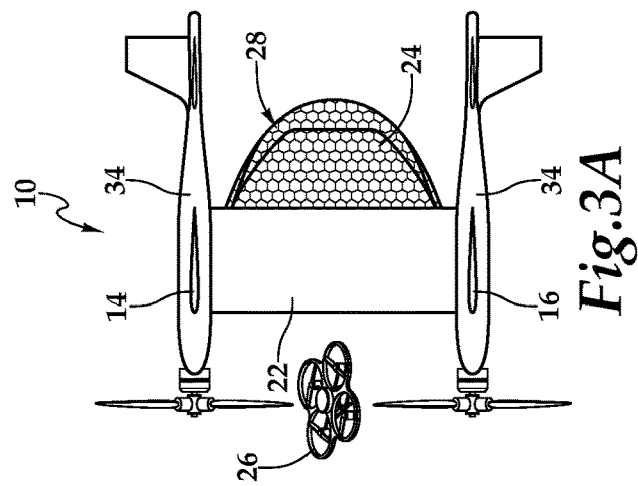
FIGS. 3A-3F are schematic illustrations of the drone capture aircraft of FIG. 1 in a sequential flight operating scenario in accordance with embodiments of the present disclosure.
Figure 3B:
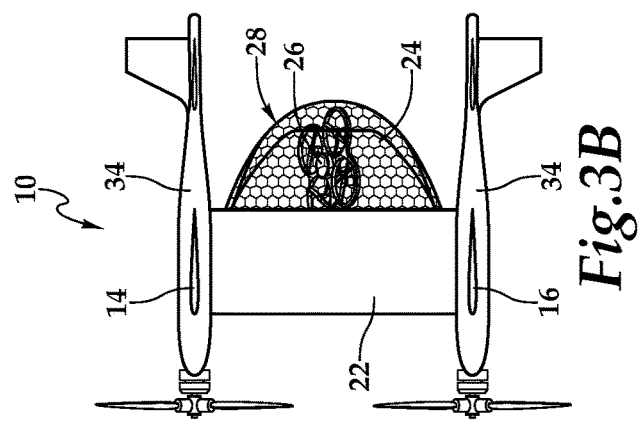
Figure 3C:
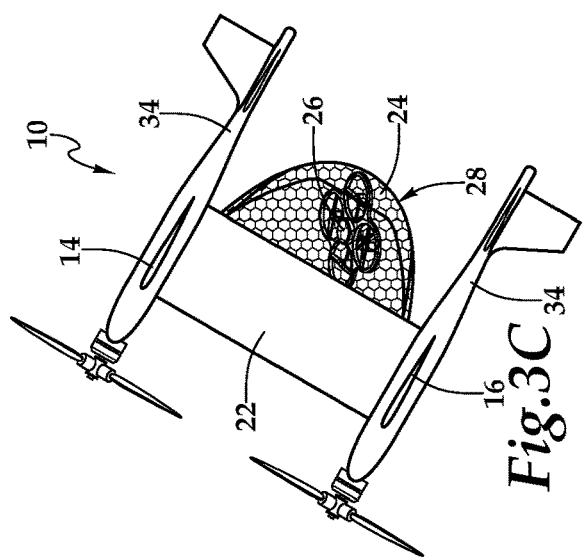
Figure 3D:
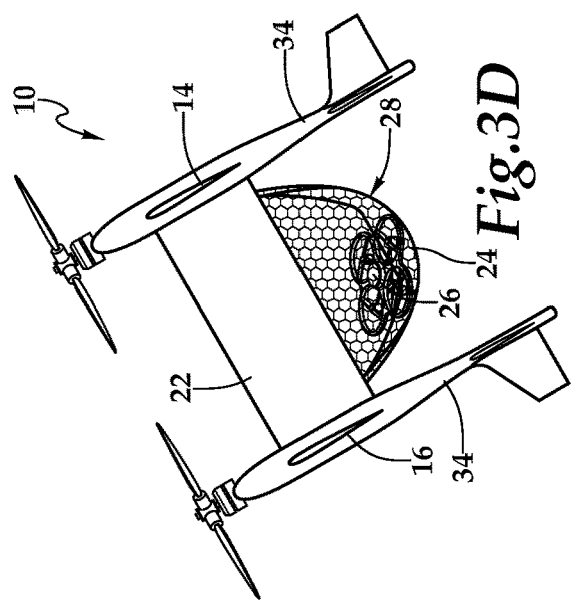
Figure 3E:
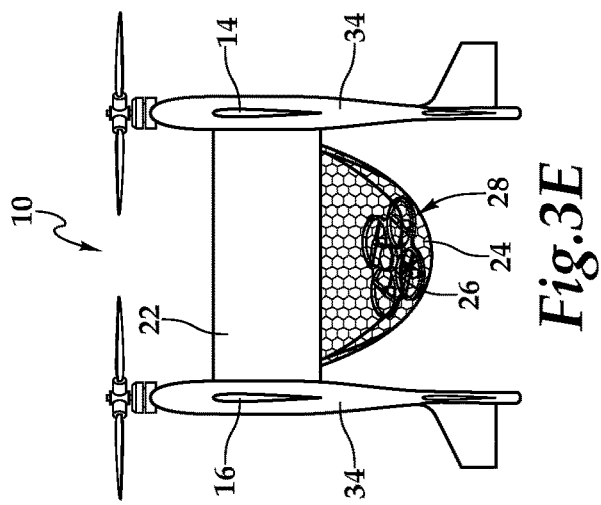
Figure 3F:
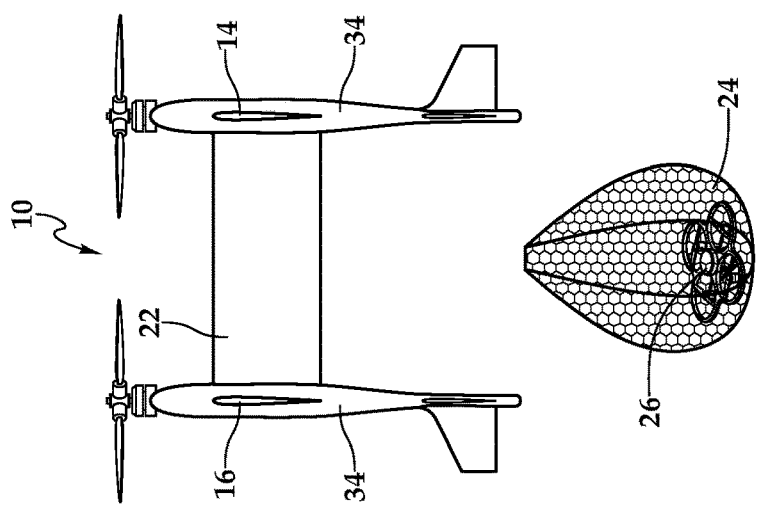

Referring now to FIGS. 3A-3F in the drawings, another sequential flight-operating scenario of aircraft 10 is depicted. As seen in FIG. 3A, aircraft 10 is overtaking drone 26 such that drone 26 is aligned with drone channel 22 and is sufficiently remote from the rotor discs of propulsion assemblies 34. Preferably, mesh bag 24 is configured to ensnare drone 26 disabling rotary operations of drone 26 once drone 26 is trapped in drone capture net 28, as best seen in FIG. 3B. In the illustrated scenario, after capturing drone 26, aircraft 10 continues to operate in high speed forward flight with drone 26 trapped in drone capture net 28 to remove drone 26 from the threat theater and to transport drone 26 to a desired location. As aircraft 10 approaches the desired location, aircraft 10 may begin its transition from wing-borne lift to thrust-borne lift, as best seen from the progression of FIGS. 3B-3E. Once aircraft 10 has completed the transition to the VTOL orientation, aircraft 10 may jettisoned mesh bag 24 with drone 26 captured therein from aircraft 10 during flight at a desired location such as a secure repository or other safe location. Alternatively, aircraft 10 could jettisoned mesh bag 24 with drone 26 captured therein from aircraft 10 during forward flight.

Figure 4:
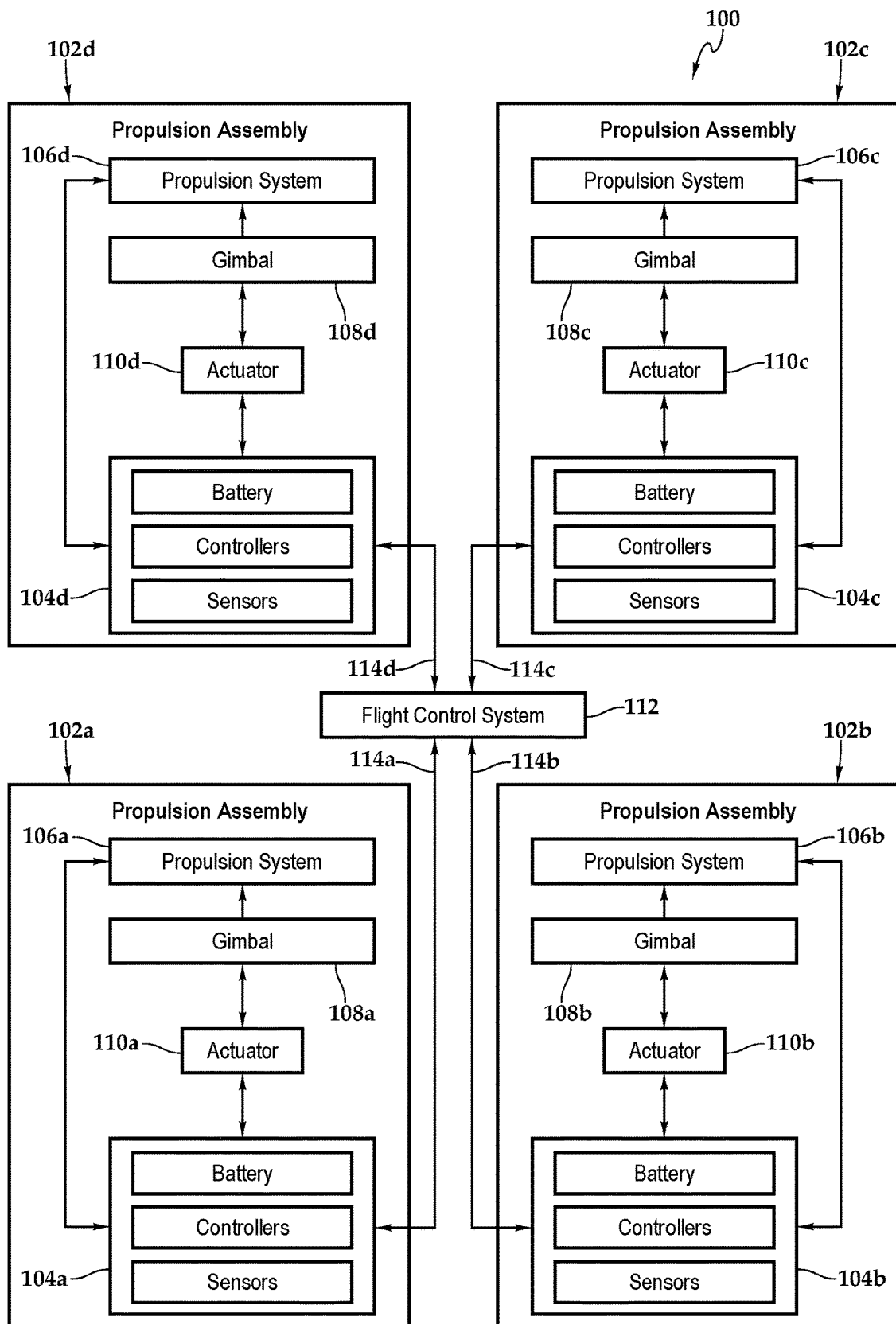
FIG. 4 is a block diagram of one implementation of a thrust array and a flight control system for a drone capture aircraft in accordance with embodiments of the present disclosure.

Referring next to FIG. 4, a block diagram illustrates one implementation of a thrust array and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes an electronics node 104a depicted as including controllers, sensors and one or more batteries. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including controllers, sensors and one or more batteries. Propulsion assembly 102b also includes a propulsion system 106b described herein as including an electric motor and a rotor assembly. In the illustrated embodiment, propulsion assembly 102b includes a two-axis gimbal 108b operated by one or more actuators 110b. Propulsion assembly 102c includes an electronics node 104c depicted as including controllers, sensors and one or more batteries. Propulsion assembly 102c also includes a propulsion system 106c described herein as including an electric motor and a rotor assembly. In the illustrated embodiment, propulsion assembly 102c includes a two-axis gimbal 108c operated by one or more actuators 110c. Propulsion assembly 102d includes an electronics node 104d depicted as including controllers, sensors and one or more batteries. Propulsion assembly 102d also includes a propulsion system 106d described herein as including an electric motor and a rotor assembly. In the illustrated embodiment, propulsion assembly 102d includes a two-axis gimbal 108d operated by one or more actuators 110d.

A flight control system 112 is operably associated with each of propulsion assemblies 102a, 102b, 102c, 102d and is communicably linked to the electronic nodes 104a, 104b, 104c, 104d thereof by a communications network depicted as arrows 114a, 114b, 114c, 114d between flight control system 112 and propulsion assemblies 102a, 102b, 102c, 102d. Flight control system 112 receives sensor data from and sends commands to propulsion assemblies 102a, 102b, 102c, 102d to enable flight control system 112 to independently control each of propulsion assemblies 102a, 102b, 102c, 102d as discussed herein.

Figure 5:
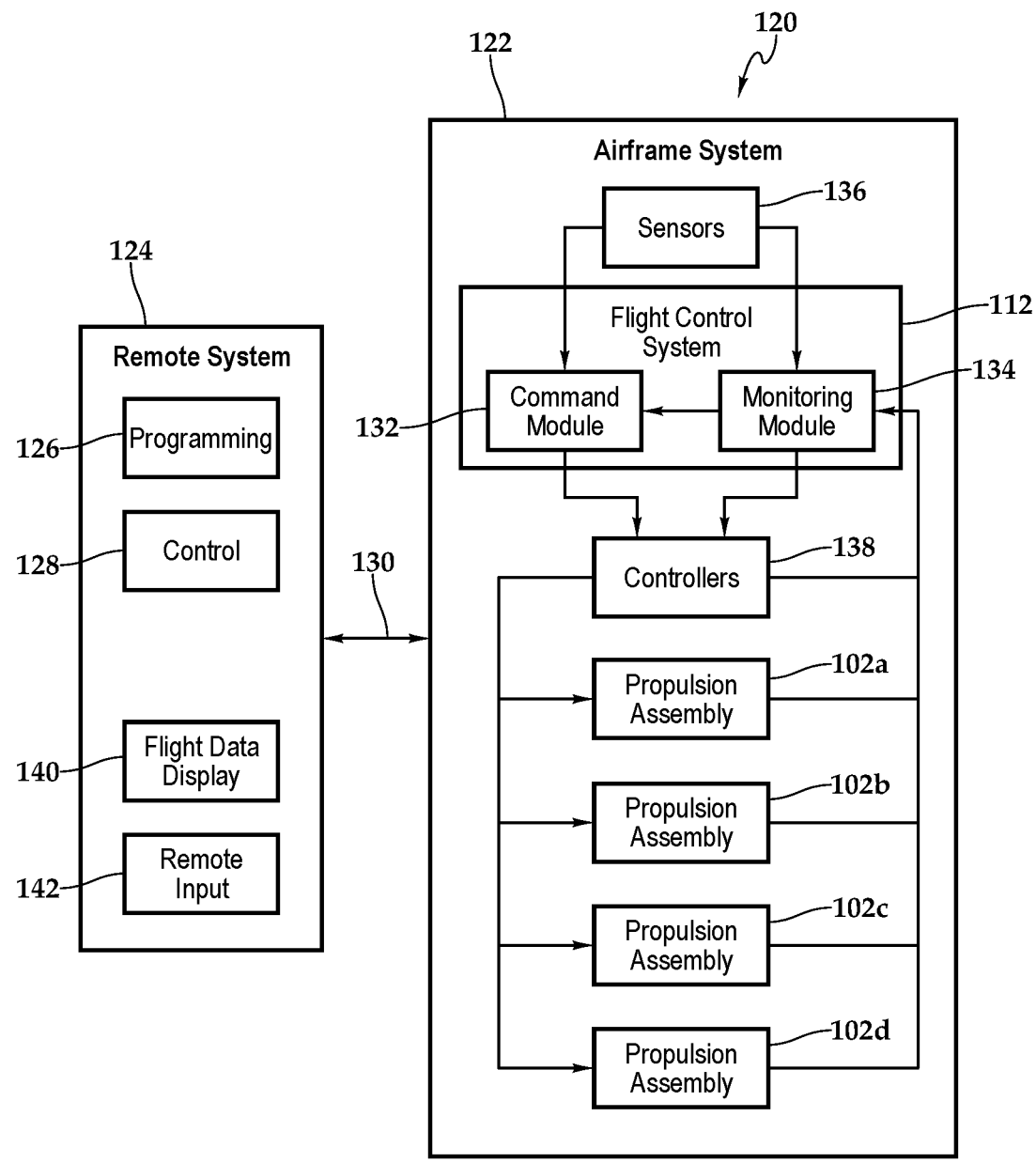
FIG. 5 is a block diagram of autonomous and remote control systems for a drone capture aircraft in accordance with embodiments of the present disclosure.

Referring additionally to FIG. 5 in the drawings, a block diagram depicts a control system 120 operable for use with aircraft 100 or aircraft 10 of the present disclosure. In the illustrated embodiment, system 120 includes two primary computer based subsystems; namely, an airframe system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a starting point, a trail of waypoints and an ending point such that flight control system 112 may use waypoint navigation during the mission. In addition, programming application 126 may provide one or more tasks to flight control system 112 for aircraft 100 to accomplish during the mission such as the targeting and capture of drone 26. Following programming, aircraft 100 may operate autonomously responsive to commands generated by flight control system 112.

Flight control system 112 preferably includes a non-transitory computer readable storage medium including a set of computer instructions executable by a processor. Flight control system 112 may be a triply redundant system implemented on one or more general-purpose computers, special purpose computers or other machines with memory and processing capability. For example, flight control system 112 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 112 may be a microprocessor-based system operable to execute program code in the form of machine-executable instructions. In addition, flight control system 112 may be selectively connectable to other computer systems via a proprietary encrypted network, a public encrypted network, the Internet or other suitable communication network that may include both wired and wireless connections.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers 138 and propulsion assemblies 102a, 102b, 102c, 102d and external sources such as remote system 124 as well as global positioning system satellites or other location positioning systems and the like. For example, as discussed herein, flight control system 112 may receive a flight plan for a mission from remote system 124. Thereafter, flight control system 112 may be operable to autonomously control all aspects of flight of an aircraft of the present disclosure.

For example, during the various operating modes of aircraft 100 including vertical takeoff and landing flight mode, hover flight mode, forward flight mode and transitions therebetween, command module 132 provides commands to controllers 138. These commands enable independent operation of each propulsion assembly 102a, 102b, 102c, 102d including rotor speed, thrust vector and the like. Flight control system 112 receives feedback from controllers 138 and each propulsion assembly 102a, 102b, 102c, 102d. This feedback is processes by monitoring module 134 that can supply correction data and other information to command module 132 and/or controllers 138. Sensors 136, such as positioning sensors, attitude sensors, speed sensors, environmental sensors, fuel sensors, temperature sensors, location sensors and the like also provide information to flight control system 112 to further enhance autonomous control capabilities. Sensors 136 may also include one more modules to enable and/or enhance drone capture operations such as an air reconnaissance module, a light detection and ranging module, a camera module, an optical targeting module, a laser module or other suitable sensor modules.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 6B:
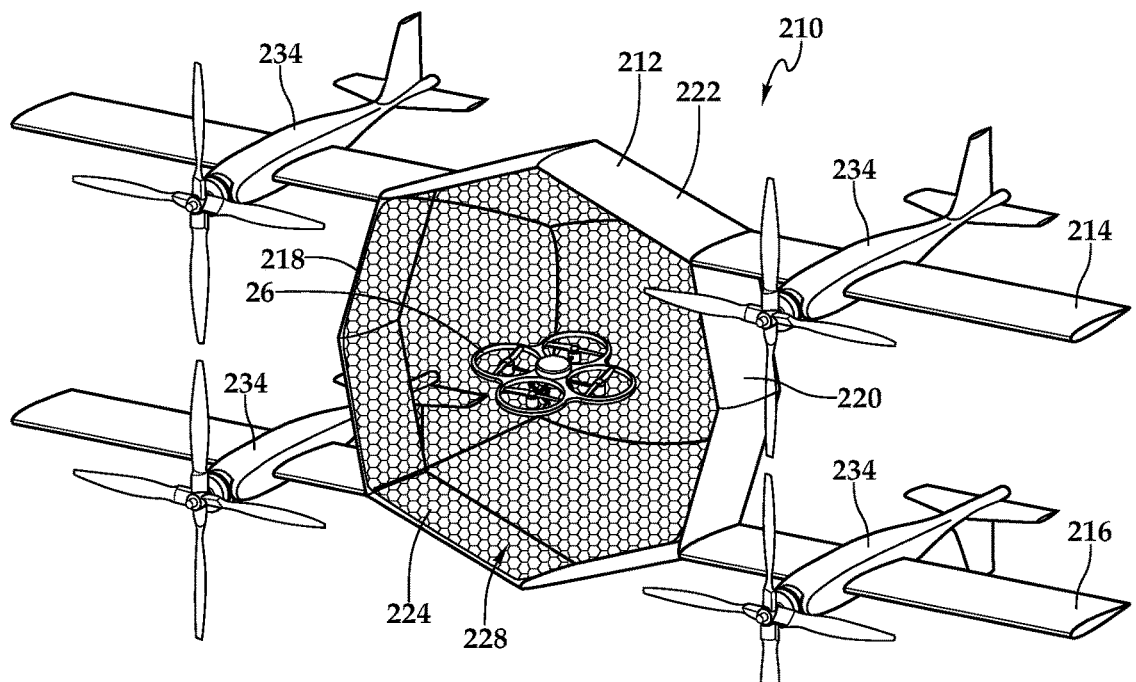
FIGS. 6A-6B are schematic illustrations of a drone capture aircraft operable to convert between thrust-borne lift in a VTOL orientation and wing-borne lift in a biplane orientation in accordance with embodiments of the present disclosure.
Figure 6A:
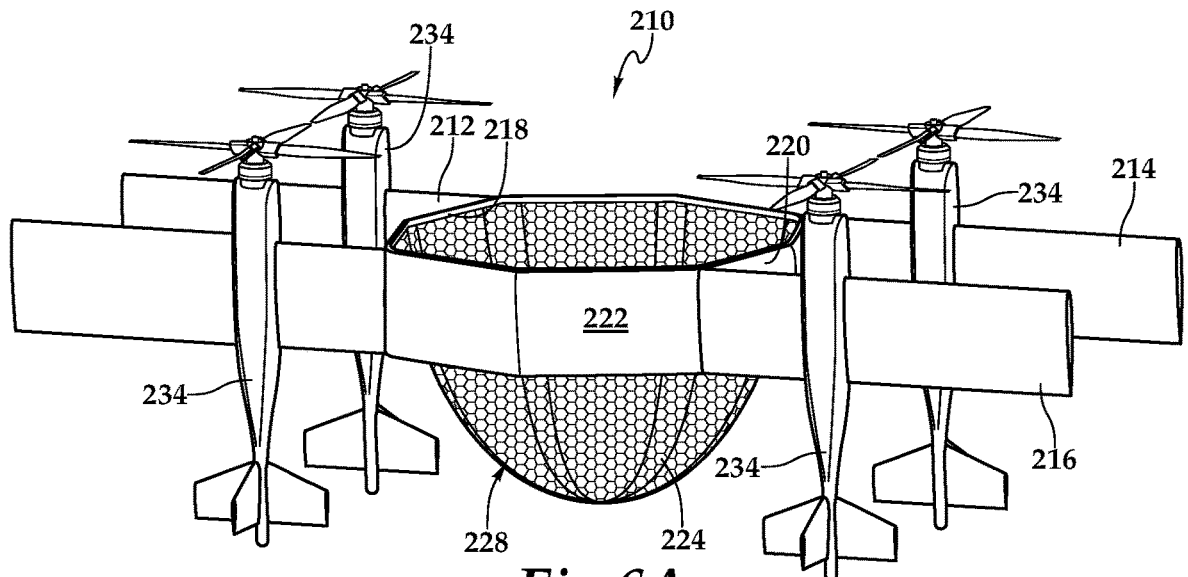

Referring to FIGS. 6A-6B in the drawings, various views of an aircraft 210 operable to transition between thrust-borne lift in a VTOL orientation and wing-borne lift in a biplane orientation are depicted. In the illustrated embodiment, aircraft 210 has an airframe 212 including wings 214, 216 each having an airfoil cross-section that generates lift responsive to the forward airspeed of aircraft 210. Wings 214, 216 may be formed as single members or may be formed from multiple wing sections. In the illustrated embodiment, each of wings 214, 216 includes a central section that is in the form of a polygon section and more particularly, two sides of an octagon. Extending between wings 214, 216 are two truss structures depicted as pylons 218, 220. In the illustrated embodiment, pylons 218, 220 are formed as polygon sections and more particularly, two sides of an octagon. The central portion of wings 214, 216 and pylons 218, 220 together create a drone channel 222 having a perimeter in the shape of a regular convex polygon and in this case an octagon. Alternatively, airframe 212 could be described as having a drone channel 222 in the form of an octagon that has two wing sections extending, respectively, in the port and starboard directions from drone channel 222 that together form wing 214 and two wing sections extending, respectively, in the port and starboard directions from drone channel 222 that together form wing 216. Even though airframe 212 has been depicted and described as having a regular convex polygonal shaped drone channel 222, it should be understood by those having ordinary skill in the art that an airframe of a drone capture aircraft of the present disclosure could alternatively have a drone channel having other polygonal shapes including irregular polygonal shapes as well as non-polygonal shaped drone channels. Coupled to drone channel 222 is a mesh bag 224 depicted as a filament matrix with open spaces therebetween such that air is able to pass through mesh bag 224 during flight and, in particular, to enable high speed forward flight with minimal drag. Together, drone channel 222 and mesh bag 224 may be referred to as a drone capture net 228.

Wings 214, 216 and/or pylons 218, 220 may preferably include internal passageways operable to contain flight control systems, energy sources, communication lines and other desired systems. In the illustrated embodiment, aircraft 210 has a two-dimensional distributed thrust array that is coupled to airframe 212 includes a plurality of propulsion assemblies, individually and collectively denoted as 234. In the illustrated embodiment, two propulsion assemblies 234 are coupled to wing 214 and two propulsion assemblies 234 are coupled to wing 216 such that each propulsion assembly 234 has a rotor disc that is outboard of drone channel 222, thereby preventing interference with drone capture operations. Each propulsion assembly 234 includes a nacelle that houses components including, for example, a battery, an electronic speed controller, a gimbal actuator, an electronics node, sensors and other electronic equipment and a propulsion system including a gimbal, a variable speed electric motor and a rotor assembly. In addition, each propulsion assembly 234 has a tail assembly that includes a plurality of aerosurfaces.

Figure 7B:
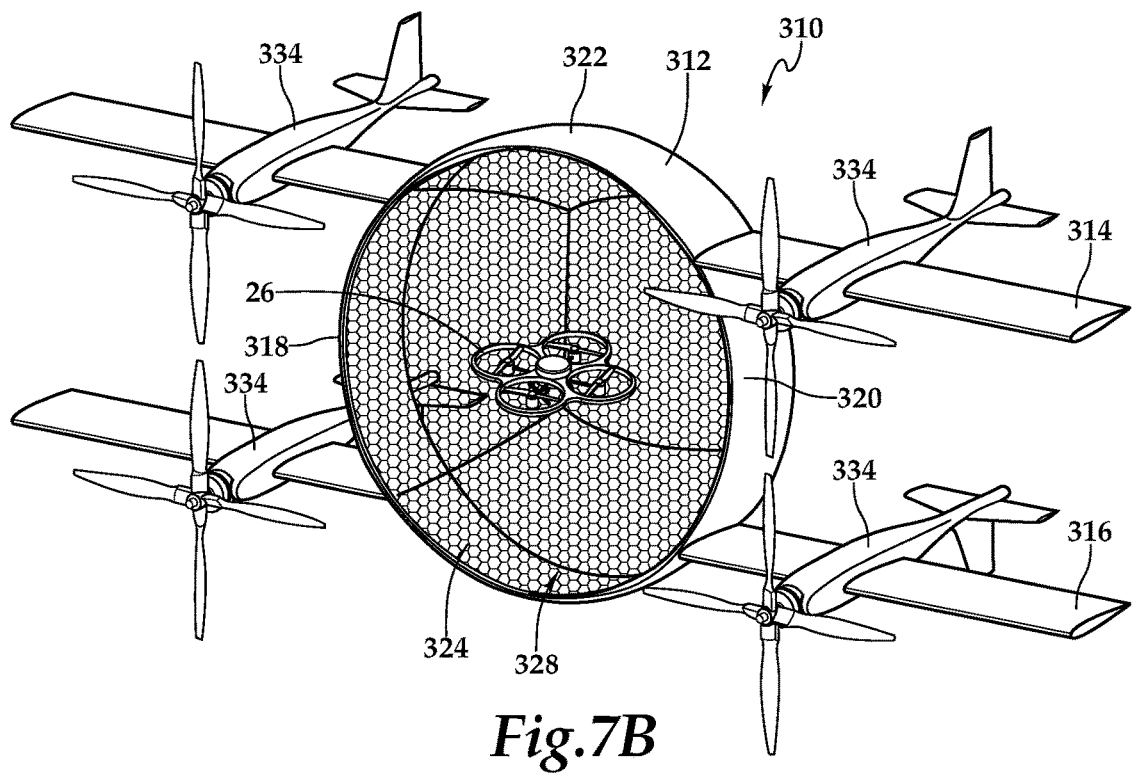
FIGS. 7A-7B are schematic illustrations of a drone capture aircraft operable to convert between thrust-borne lift in a VTOL orientation and wing-borne lift in a biplane orientation in accordance with embodiments of the present disclosure.
Figure 7A:
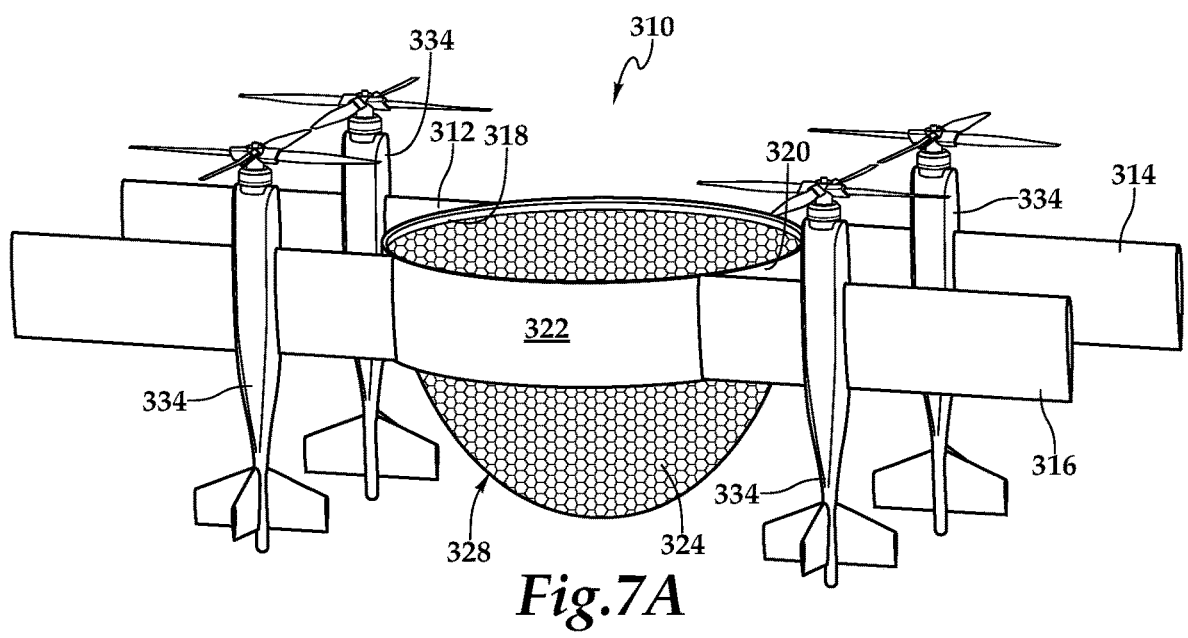

Referring to FIGS. 7A-7B in the drawings, various views of an aircraft 310 operable to transition between thrust-borne lift in a VTOL orientation and wing-borne lift in a biplane orientation are depicted. In the illustrated embodiment, aircraft 310 has an airframe 312 including wings 314, 316 each having an airfoil cross-section that generates lift responsive to the forward airspeed of aircraft 310. Wings 314, 316 may be formed as single members or may be formed from multiple wing sections. In the illustrated embodiment, each of wings 314, 316 includes a central section that is in the form of an arcuate section. Extending between wings 314, 316 are two truss structures depicted as pylons 318, 320. In the illustrated embodiment, pylons 318, 320 are formed as arcuate sections. The central portion of wings 314, 316 and pylons 318, 320 together create a drone channel 322 having a perimeter in the shape of a circle. Alternatively, airframe 312 could be described as having a drone channel 322 in the form of a circle that has two wing sections extending, respectively, in the port and starboard directions from drone channel 322 that together form wing 314 and two wing sections extending, respectively, in the port and starboard directions from drone channel 322 that together form wing 316. Even though airframe 312 has been depicted and described as having a circular shaped drone channel 322, it should be understood by those having ordinary skill in the art that an airframe of a drone capture aircraft of the present disclosure could alternatively have a drone channel having other shapes including irregular shapes. As one example, the pylons extending between the wings could be formed as polygon sections or arcuate sections while the wings could be straight wings. Coupled to drone channel 322 is a mesh bag 324 depicted as a filament matrix with open spaces therebetween such that air is able to pass through mesh bag 324 during flight and, in particular, to enable high speed forward flight with minimal drag. Together, drone channel 322 and mesh bag 324 may be referred to as a drone capture net 328.

Wings 314, 316 and/or pylons 318, 320 may preferably include internal passageways operable to contain flight control systems, energy sources, communication lines and other desired systems. In the illustrated embodiment, aircraft 310 has a two-dimensional distributed thrust array that is coupled to airframe 312 includes a plurality of propulsion assemblies, individually and collectively denoted as 334. In the illustrated embodiment, two propulsion assemblies 334 are coupled to wing 314 and two propulsion assemblies 334 are coupled to wing 316 such that each propulsion assembly 334 has a rotor disc that is outboard of drone channel 322, thereby preventing interference with drone capture operations. Each propulsion assembly 334 includes a nacelle that houses components including, for example, a battery, an electronic speed controller, a gimbal actuator, an electronics node, sensors and other electronic equipment and a propulsion system including a gimbal, a variable speed electric motor and a rotor assembly. In addition, each propulsion assembly 334 has a tail assembly that includes a plurality of aerosurfaces.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft for capturing a drone, the aircraft comprising:

an airframe having a drone channel with first and second wings extending outboard thereof;

a two-dimensional distributed thrust array attached to the airframe, the thrust array including a plurality of propulsion assemblies coupled to the first wing and a plurality of propulsion assemblies coupled to the second wing such that a rotor disc of each propulsion assembly is outboard of the drone channel;

a flight control system coupled to the airframe and operable to independently control each of the propulsion assemblies; and a mesh bag coupled to the drone channel forming a drone capture net;

wherein, the aircraft is configured to convert between thrust-borne lift in a VTOL orientation and wing-borne lift in a biplane orientation; and wherein, the aircraft is configured to overtake the drone during flight in the biplane orientation such that the drone passes through the drone channel into the mesh bag, thereby capturing the drone in the drone capture net.

2. The aircraft as recited in claim 1 wherein the drone channel has a regular convex polygon shaped perimeter.

3. The aircraft as recited in claim 1 wherein the drone channel has a rectangular shaped perimeter.

4. The aircraft as recited in claim 1 wherein the drone channel has a square shaped perimeter.

5. The aircraft as recited in claim 1 wherein the drone channel has a circular shaped perimeter.

6. The aircraft as recited in claim 1 wherein the first and second wings are parallel to each other.

7. The aircraft as recited in claim 1 wherein the first wing has a starboard wing section extending from a starboard side of the drone channel and a port wing section extending from a port side of the drone channel and wherein the second wing has a starboard wing section extending from the starboard side of the drone channel and a port wing section extending from the port side of the drone channel.

8. The aircraft as recited in claim 1 wherein at least a portion of the first wing forms a portion of the drone channel and wherein at least a portion of the second wing forms a portion of the drone channel.

9. The aircraft as recited in claim 8 wherein each of the wings includes a polygon section.

10. The aircraft as recited in claim 8 wherein each of the wings includes an arcuate section.

11. The aircraft as recited in claim 1 wherein the mesh bag further comprises a filament matrix with open spaces configured to allow air to pass therethrough during flight.

12. The aircraft as recited in claim 1 wherein the mesh bag is configured to disable rotary operations of the drone after capturing the drone.

13. The aircraft as recited in claim 1 wherein the mesh bag further comprises a releasable mesh bag that is configured to be jettisoned from the drone channel after capturing the drone.

14. An aircraft for capturing a drone, the aircraft comprising:

an airframe having first and second wings with first and second pylons extending therebetween forming a drone channel;

a two-dimensional distributed thrust array attached to the airframe, the thrust array including a plurality of propulsion assemblies coupled to the first wing and a plurality of propulsion assemblies coupled to the second wing such that a rotor disc of each propulsion assembly is outboard of the drone channel;

a flight control system coupled to the airframe and operable to independently control each of the propulsion assemblies; and a mesh bag coupled to the drone channel forming a drone capture net;

wherein, the aircraft is configured to convert between thrust-borne lift in a VTOL orientation and wing-borne lift in a biplane orientation; and wherein, the aircraft is configured to overtake the drone during flight in the biplane orientation such that the drone passes through the drone channel into the mesh bag, thereby capturing the drone in the drone capture net.

15. The aircraft as recited in claim 14 wherein the drone channel has a perimeter shape selected from the group consisting of regular convex polygons, rectangles, squares or circles.

16. The aircraft as recited in claim 14 wherein the first and second wings are parallel to each other and wherein the first and second pylons are parallel to each other such that the drone channel has a rectangular shaped perimeter.

17. The aircraft as recited in claim 14 wherein each of the wings includes a polygon section and wherein each of the pylons has a polygon section such that the drone channel has a regular convex polygon shaped perimeter.

18. The aircraft as recited in claim 14 wherein each of the wings includes an arcuate section and wherein each of the pylons has an arcuate section such that the drone channel has a circular shaped perimeter.

19. The aircraft as recited in claim 14 wherein the mesh bag further comprises a filament matrix with open spaces configured to allow air to pass therethrough during flight and configured to disable rotary operations of the drone after capturing the drone.

20. The aircraft as recited in claim 14 wherein the mesh bag further comprises a releasable mesh bag that is configured to be jettisoned from the drone channel after capturing the drone.

* * * * *